United States Patent
Matsushima (10) Patent No.: US 10,007,162 B2
(45) Date of Patent: Jun. 26, 2018

(54) LIQUID CRYSTAL DISPLAY DEVICE

(71) Applicant: Japan Display Inc., Minato-ku (JP)

(72) Inventor: Toshiharu Matsushima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days. days.

(21) Appl. No.: 15/446,507

(22) Filed: Mar. 1, 2017

(65) Prior Publication Data

US 2017/0255034 A1    Sep. 7, 2017

(30) Foreign Application Priority Data

Mar. 1, 2016 (JP) ................. 2016-038822

(51) Int. Cl.
| | |
|---|---|
| *G02F 1/1343* | (2006.01) |
| *G02F 1/137* | (2006.01) |
| *G02F 1/133* | (2006.01) |
| *G02F 1/1337* | (2006.01) |
| *G02F 1/1339* | (2006.01) |
| *G02F 1/1362* | (2006.01) |

(52) U.S. Cl.
CPC ............ *G02F 1/137* (2013.01); *G02F 1/1337* (2013.01); *G02F 1/1339* (2013.01); *G02F 1/13306* (2013.01); *G02F 1/134309* (2013.01); *G02F 1/136286* (2013.01); *G02F 1/134363* (2013.01); *G02F 2001/134318* (2013.01); *G02F 2001/134345* (2013.01); *G02F 2001/134372* (2013.01); *G02F 2201/121* (2013.01); *G02F 2201/123* (2013.01)

(58) Field of Classification Search
CPC ............... G02F 2001/134372; G02F 1/134363
See application file for complete search history.

(56) References Cited

U.S. PATENT DOCUMENTS

| | | |
|---|---|---|
| 2013/0100388 A1 | 4/2013 | Matsushima |
| 2014/0092353 A1 | 4/2014 | Matsushima |
| 2014/0293175 A1 | 10/2014 | Tamaki et al. |
| 2014/0354931 A1 | 12/2014 | Kurasawa et al. |
| 2015/0160520 A1 | 6/2015 | Matsushima |
| 2016/0062158 A1 | 3/2016 | Matsushima |

FOREIGN PATENT DOCUMENTS

JP    2015-114493    6/2015

*Primary Examiner* — Wen-Ying P Chen
(74) *Attorney, Agent, or Firm* — Oblon, McClelland, Maier & Neustadt, L.L.P.

(57) ABSTRACT

A liquid crystal display device comprises a first substrate and a liquid crystal layer. The substrate includes a pixel electrode and sub-pixel areas including a first area and a second area. The first area is an area where the pixel electrode exists, the second area is an area where the pixel electrode does not exist. The first area includes first and second main areas. The second area includes a first gap area extending in a second direction, between the first and second main areas. The first gap area includes first and second end parts in the second direction, and a central part between the first and second end parts. A width of the first gap area in the first direction is greater at the central part than at any one of the first end part and the second end part.

20 Claims, 9 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2016-038822, filed Mar. 1, 2016, the entire contents of which are incorporated herein by reference.

FIELD

Embodiments described herein relate generally to a liquid crystal display device.

BACKGROUND

An in-plane-switching (IPS) mode liquid crystal display device is well known as an example of display devices. The IPS mode liquid crystal display device comprises a pixel electrode and a common electrode disposed on one of a pair of substrates opposed to each other through a liquid crystal layer, and controls the alignment of the liquid crystal molecules in the liquid crystal layer by using a lateral electric field generated between these electrodes. In addition, a fringe field switching (FFS) mode liquid crystal display device comprising a pixel electrode and a common electrode disposed in different layers to control the alignment of the liquid crystal molecules by using a fringing field generated between these electrodes has been put into practical use.

In contrast, a liquid crystal display device comprising a pixel electrode and a common electrode disposed in different layers and further comprising a slit on the electrode on the side closer to the liquid crystal layer to rotate the liquid crystal molecules in the vicinity of both sides of the slit in a width direction in different directions (opposite directions) is known. This liquid crystal display device is a display device of a type obviously different from the FFS mode, and can make a response speed higher and improve alignment stability as the compared with the FFS mode. In the present disclosure, configuration of the liquid crystal display device of this type is called a high-speed response mode.

DETAILED DESCRIPTION

In general, according to one embodiment, a liquid crystal display device comprises a first substrate and a liquid crystal layer including liquid crystal molecules. The first substrate includes video signal lines, a pixel electrode electrically connected to the video signal lines, a common electrode opposed to the pixel electrode and configured to generate an electric field with the pixel electrode to rotate the liquid crystal molecules, and sub-pixel areas including a first area and a second area. The first area is an area where the pixel electrode exists. The second area is an area where the pixel electrode does not exist. The first area includes a first main area and a second main area adjacent to each other, the first main area and the second main area being arranged in a first direction and extending in a second direction intersecting the first direction. The sub-pixel areas each have a first side and a second side in the second direction and have a third side and a fourth side in the first direction. When the electric field is generated, a rotation direction of the liquid crystal molecules is different between near the fourth side of the first main area and near the third side of the second main area. The second area includes a first gap area extending in the second direction, between the first main area and the second main area. The first gap area includes a first end part and a second end part in the second direction, and a central part between the first end part and the second end part. A width of the first gap area in the first direction is greater at the central part than at any one of the first end part and the second end part.

According to another embodiment, a liquid crystal display device comprises a first substrate and a liquid crystal layer including liquid crystal molecules. The first substrate includes video signal lines, a pixel electrode electrically connected to the video signal lines, a common electrode opposed to the pixel electrode and configured to generate an electric field with the pixel electrode to rotate the liquid crystal molecules, and sub-pixel areas including a first area and a second area. The first area is an area where the common electrode does not exist. The second area is an area where the common electrode exists. The first area includes a first main area and a second main area adjacent to each other, the first main area and the second main area being arranged in a first direction and extending in a second direction intersecting the first direction. The sub-pixel areas each have a first side and a second side in the second direction and have a third side and a fourth side in the first direction. When the electric field is generated, a rotation direction of the liquid crystal molecules is different between near the fourth side of the first main area and near the third side of the second main area. The second area includes a first gap area extending in the second direction, between the first main area and the second main area. The first gap area includes a first end part and a second end part in the second direction, and a central part between the first end part and the second end part. A width of the first gap area in the first direction is greater at the central part than at any one of the first end part and the second end part.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the elements are illustrated schematically in the drawings, rather than as an accurate representation of what is implemented. However, such schematic illustration is merely exemplary, and in no way restricts the interpretation of the invention. In the figures, reference numbers of continuously arranged elements equivalent or similar to each other may be omitted. In addition, in the specification and drawings, structural elements which function in the same or a similar manner to those described in connection with preceding drawings are denoted by like reference numbers, detailed description thereof being omitted unless necessary.

In the embodiments, a transmissive-type liquid crystal display device is described as an example of the liquid crystal display device. However, each of the embodiments does not prevent application of individual technical ideas described in the embodiment to display devices of other types. A reflective-type liquid crystal display device capable of displaying an image by using external light, a liquid crystal display device comprising functions of both the transmissive-type liquid crystal display device and the reflection-type liquid crystal display device, and the like, may be conceived as the display devices of the other types.

(First Embodiment)

Figure 1:
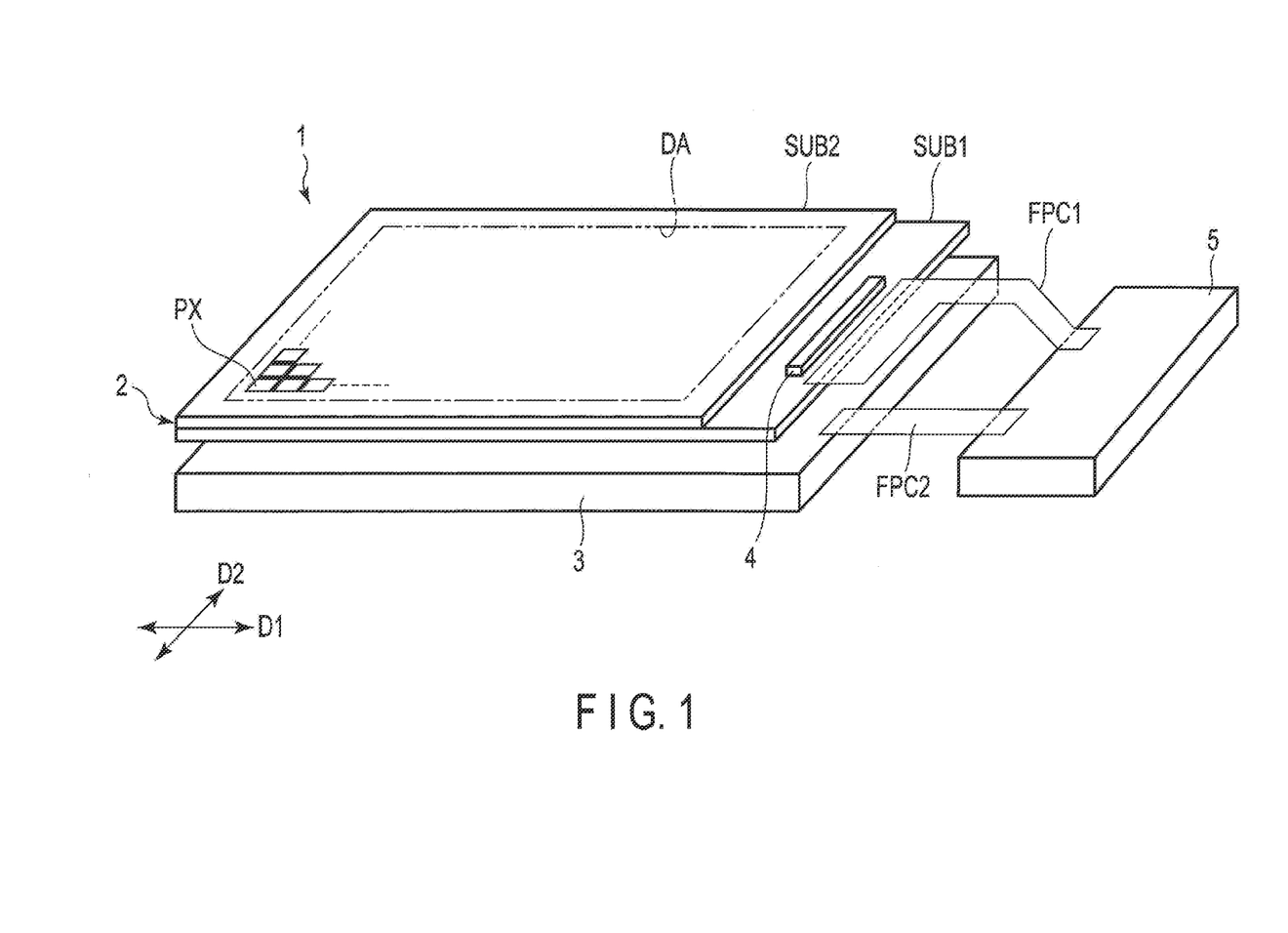
FIG. 1 is a perspective view showing a schematic configuration of a liquid crystal display device of a first embodiment.

FIG. 1 is a perspective view showing a schematic configuration of a liquid crystal display device 1 of a first embodiment. The liquid crystal display device 1 can be used in, for example, various types of devices such as smartphones, tablet terminals, mobile telephone terminals, personal computers, TV receivers, vehicle-mounted devices, game consoles and wearable terminals.

The liquid crystal display device 1 comprises a display panel 2, a backlight 3 opposed to the display panel 2, a driver IC 4 which drives the display panel 2, a control module 5 which controls operations of the display panel 2 and the backlight 3, and flexible printed circuits FPC1 and FPC2 which transmit control signals to the display panel 2 and the backlight 3.

In the present embodiment, a first direction D1 is a direction in which main areas 30 to be explained later are arranged and a second direction D2 is a direction orthogonal to the first direction D1. In FIG. 1, the first direction D1 also corresponds to a direction of a long side of the display panel 2. The second direction D2 also corresponds to, for example, a direction of a short side of the display panel 2. In the example illustrated, the first directions D1 and D2 are perpendicular to each other but may cross at any angles.

The display panel 2 includes a first substrate SUB1 and a second substrate SUB2 opposed to each other, and a liquid crystal layer (a liquid crystal layer LC to be explained later) held between the first substrate SUB1 and the second substrate SUB2. The display panel 2 includes a display area DA on which an image is displayed. The display panel 2 includes, for example, pixels PX arrayed in a matrix in the directions D1 and D2, in the display area DA.

Figure 2:
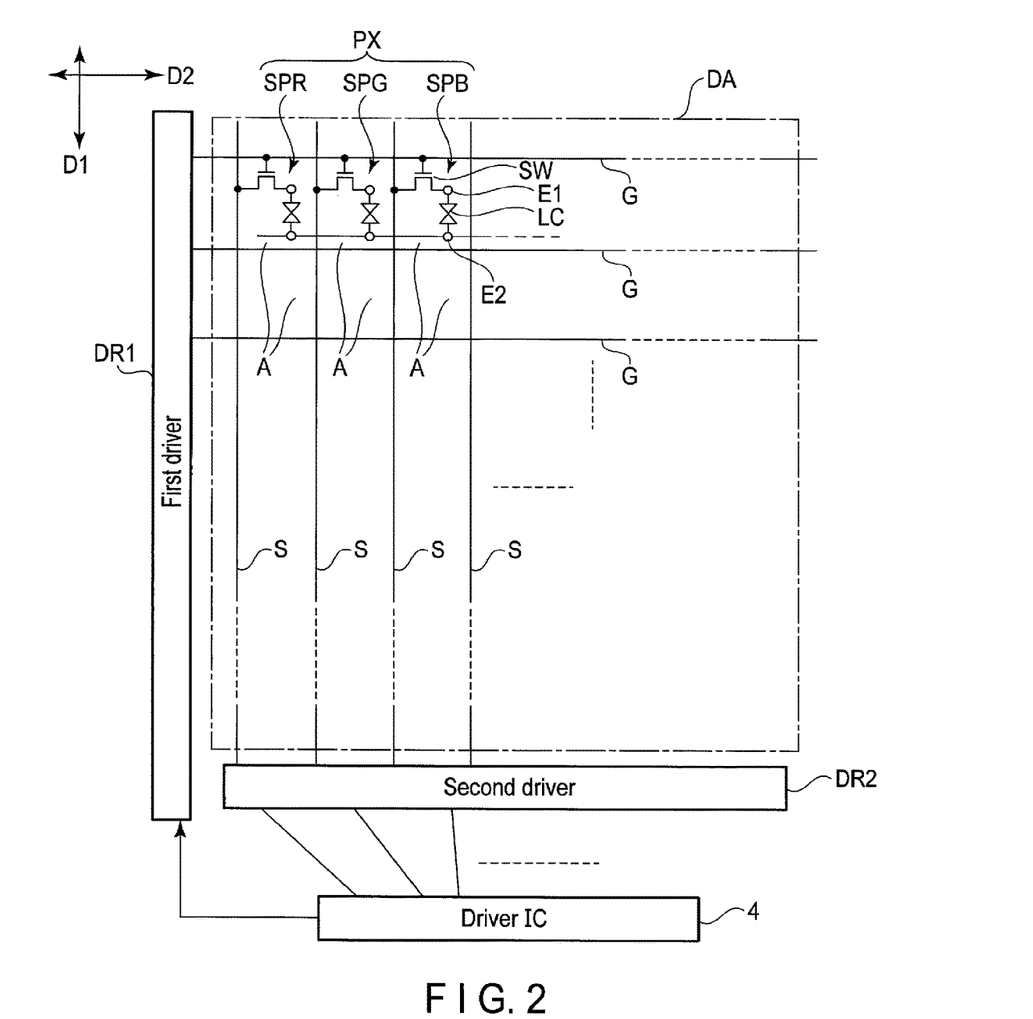
FIG. 2 is a plan view showing a schematic equivalent circuit of the liquid crystal display device.

FIG. 2 is a plan view showing a schematic equivalent circuit of the liquid crystal display device 1. The liquid crystal display device 1 comprises a first driver DR1, a second driver DR2, scanning signal lines G connected to the first driver DR1, and video signal lines S connected to the second driver DR2. The scanning signal lines G extend in the second direction D2 and are arranged in the first direction D1, in the display area DA. The video signal lines S extend in the first direction D1 and are arranged in the second direction D2, in the display area DA.

The liquid crystal display device 1 includes sub-pixel areas A. The sub-pixel areas A are the areas divided by the scanning signal lines G and the video signal lines S, in planar view. Sub-pixels SP are formed in the respective sub-pixel areas A. In the present embodiment, one pixel PX is assumed to include sub-pixels SPR, SPG, and SPB which exhibit red, green, and blue, respectively. However, the pixel PX may further include a sub-pixel SP which exhibits white or may include sub-pixels SP corresponding to the same color.

Each sub-pixel SP comprises a switching element SW, a first electrode E1, and a second electrode E2 opposed to the first electrode E1. The first substrate E1 is formed in a first layer of the first substrate SUB1 and the second substrate E2 is formed in a second layer of the first substrate SUB1. In the present embodiment, the first electrode E1 is a pixel electrode and is provided in each sub-pixel SP together with the switching element SW. In addition, in the present embodiment, the second electrode E2 is a common electrode and is formed across a plurality of sub-pixels SP. The switching element SW is electrically connected with the scanning signal line G, the video signal line S, and the first electrode E1.

The first driver DR1 sequentially supplies scanning signals to the scanning signal lines G. The second driver DR2 selectively supplies video signals to the video signal lines S. If the scanning signal is supplied to the scanning signal line G corresponding to a certain switching element SW and the video signal is supplied to the video signal line S connected to the switching element SW, a voltage corresponding to the video signal is applied to the first electrode E1. At this time, the alignment of the liquid crystal molecules in the liquid crystal layer LC is changed from an initial alignment state in which no voltage is applied, by an electric field generated between the first electrode E1 and the second electrode E2. An image is displayed in the display area DA by this operation.

Figure 3:
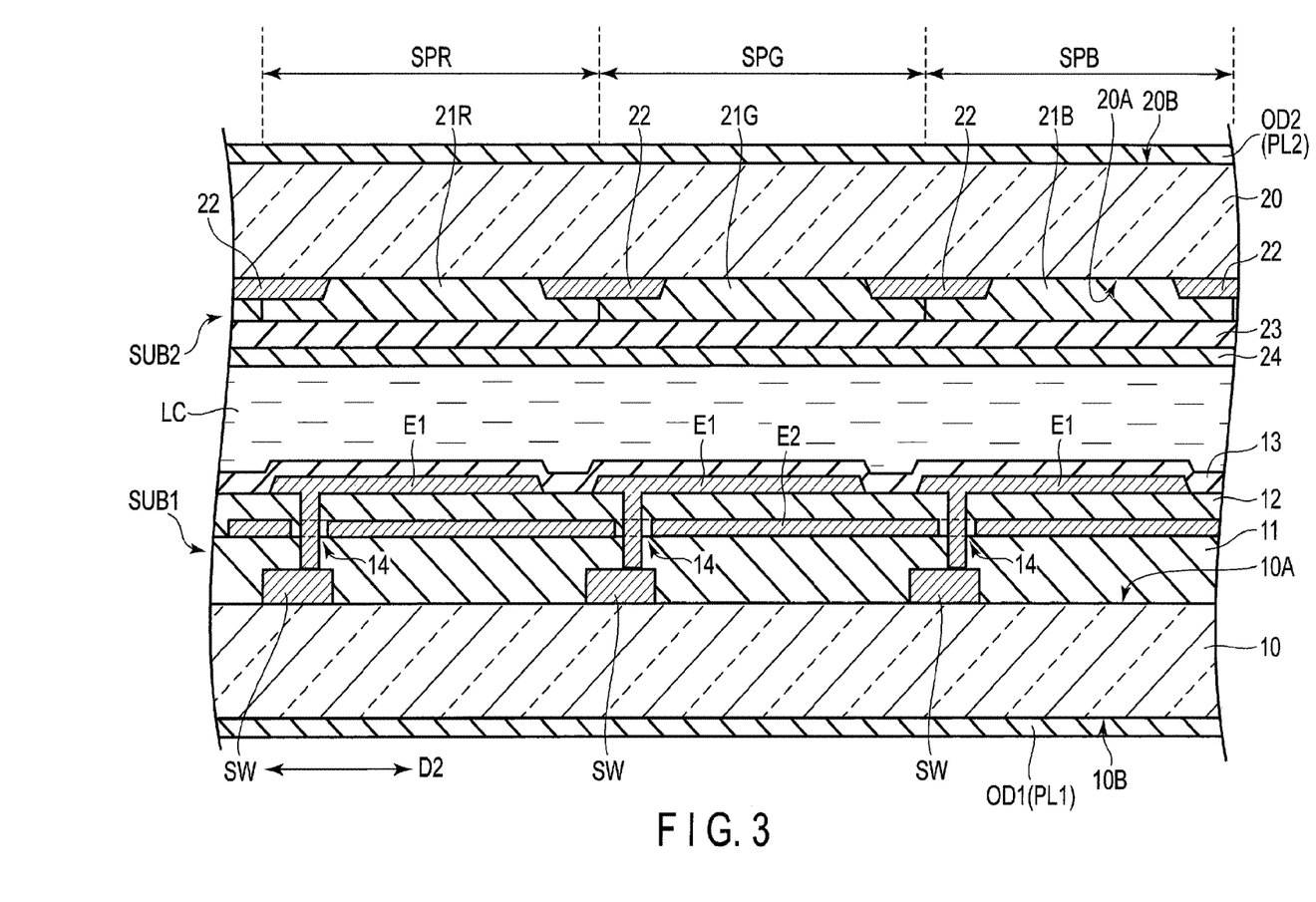
FIG. 3 is a cross-sectional view showing a part of a section of the liquid crystal display device.

FIG. 3 is a cross-sectional view showing a part of a section of the liquid crystal display device 1. In this figure, a cross-section of the sub-pixels SPR, SPG, and SPB included in one pixel PX, in the second direction D2, is illustrated.

The first substrate SUB1 includes a first insulating substrate 10 such as a glass substrate or a resin substrate having a light transmitting property. The first insulating substrate 10 has a first main surface 10A opposed to the second substrate SUB2 and a second main surface 10B on the side opposite to the first main surface 10A. Furthermore, the first substrate SUB1 includes the switching element SW, the first electrode E1, the second electrode E2, a first insulating film 11, a second insulating film 12, and a first alignment film 13.

The switching element SW is provided on the first main surface 10A of the first insulating substrate 10 and is covered with the first insulating layer 11. The scanning signal lines G and the video signal lines S are not illustrated in FIG. 3. Furthermore, the switching element SW is simplified in FIG. 3. Actually, the first insulating layer 11 includes a plurality of layers, and the switching element SW comprises a semiconductor layer and various electrodes formed in these layers.

In the example shown in FIG. 3, the first electrode E1 is provided for each of the sub-pixels SPR, SPG, and SPB, and the second electrode E2 is provided across the sub-pixels SPR, SPG, and SPB. The second electrode E2 is formed on the first insulating layer 11 (the above second layer). The second electrode E2 comprises opening portions 14 at positions opposed to the respective first electrodes E1. The second electrode E2 is covered with the second insulating layer 12.

The first electrode E1 is formed on the second insulating layer 12 (above first layer) and opposed to the second electrode E2. The first electrodes E1 are electrically connected with the switching elements SW of the sub-pixels SPR, SPG, and SPB through the opening portions 14, respectively. The first electrodes E1 and the second electrodes E2 can be formed of, for example, a transparent conductive material such as indium tin oxide (ITO). The first alignment film 13 covers the first electrode E1 and is in contact with the liquid crystal layer LC. The first alignment film 13 is subjected to alignment treatment such as rubbing treatment or optical alignment treatment.

In contrast, the second substrate SUB2 includes a second insulating substrate 20 such as a glass substrate or a resin substrate having a light transmitting property. The second insulating substrate 20 has a first main surface 20A opposed to the first substrate SUB1 and a second main surface 20B on the side opposite to the first main surface 20A. Furthermore, the second substrate SUB2 includes color filters 21 (21R, 21G, and 21B), a light-shielding layer 22, an overcoat layer 23, and a second alignment film 24. The second alignment film 24 is subjected to alignment treatment such as a rubbing treatment or an optical alignment treatment, similarly to the first alignment film 13.

The light-shielding layer 22 is disposed on boundaries of the sub-pixels SPR, SPG, and SPB in planar view. The overcoat layer 23 covers color filters 21R, 21G, and 21B and flattens surfaces of the color filters 21R, 21G, and 21B. The second alignment film 24 covers the overcoat layer 23 and in contact with the liquid crystal layer LC.

A first optical element OD1 including a first polarizer PL1 is disposed on the second main surface 10B of the first insulating substrate 10. A second optical element OD2 including a second polarizer PL2 is disposed on the second main surface 20B of the second insulating substrate 20.

Figure 4:
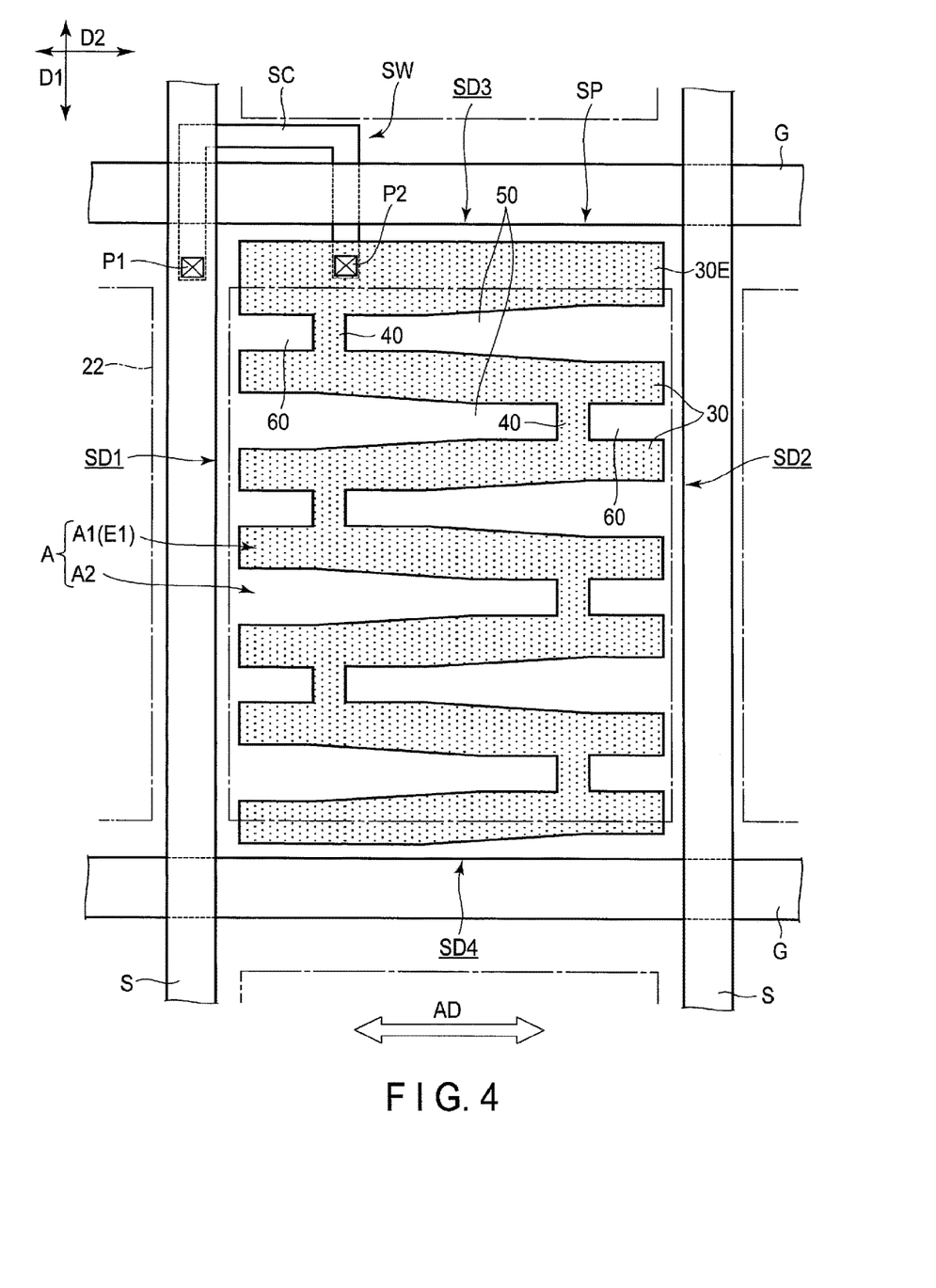
FIG. 4 is a plan view schematically showing a sub-pixel in the liquid crystal display device.

FIG. 4 is a plan view schematically showing an example of a sub-pixel SP. The above-mentioned sub-pixel area A is formed of two scanning signal lines G adjacent in the first direction D1 and two video signal lines S adjacent in the second direction D2. The sub-pixel area A has a first side SD1 and a second side SD2 in the second direction D2, and a third side SD3 and a fourth side SD4 in the first direction D1.

The sub-pixel area A includes a first area A1 and a second area A2. Both the areas A1 and A2 are included in the first layer. In FIG. 4, hatching of dots is drawn in the first area A1. The second area A2 is a shape obtained by removing the first area A1 from the sub-pixel area A.

One of the first area A1 and the second area A2 is an area in which the first electrode E1 (pixel electrode) is formed and the other is an area in which the first electrode E1 is not formed. In the example shown in FIG. 4, the first electrode E1 is formed in the first area A1 while the first electrode E1 is not formed in the second area A2.

The first area A1 includes main areas 30 and connection areas 40. The main areas 30 are arranged in the first direction D1 and extend in the second direction D2. Each of the connection areas 40 connects adjacent main areas 30.

In the example shown in FIG. 4, the connection areas 40 connecting the odd-numbered main areas 30 seen from the upper side and the even-numbered main areas 30 seen from the lower side are disposed on the side closer to the first side SD1 than to the center of the main areas 30 in the second direction D2. In addition, the connection areas 40 connecting the even-numbered main areas 30 seen from the upper side and the odd-numbered main areas 30 seen from the lower side are disposed on the side closer to the second side SD2 than to the center of the main areas 30 in the second direction D2. The connection areas 40 disposed more closely to the first side SD1 are arranged in the first direction D1.

Similarly to this, the connection areas 40 disposed more closely to the second side SD2 are arranged in the first direction D1.

The second area A2 includes gap areas 50 and sub-areas 60. An area between the adjacent main areas 30 is divided into two parts by the connection area 40. A larger area of two divided areas corresponds to the gap area 50 and a smaller area corresponds to the sub-area 60. The gap areas 50 and the sub-areas 60 extend in the second direction D2.

The switching element SW comprises a semiconductor layer SC. The semiconductor layer SC is connected to the video signal line S at a connection position P1 and connected to the first electrode E1 at a connection position P2. In the example shown in FIG. 4, the connection position P2 is included in a main area 30E disposed at an uppermost side. The main area 30E is wider than any other main areas 30 in the first direction D1 to secure the connection position P2. The semiconductor layer SC intersects the scanning signal line G on the upper side in the figure at two times. In other words, the switching element SW is illustrated as an example of a double-gate type switching element. However, the switching element SW may be a single-gate type switching element which intersects the scanning signal line G at one time.

In FIG. 4, an edge portion of the light-shielding layer 22 is represented by a one-dot-chained line. The light-shielding layer 22 is overlaid on the scanning signal lines G, the video signal lines S, and the switching element SW. Furthermore, in the example shown in FIG. 4, the light-shielding layer 22 is partially overlaid on the uppermost and lowermost main areas 30. The light-shielding layer 22 may be overlaid on tip portions of the respective main areas 30 in the second direction D2.

The first alignment film 13 and the second alignment film 24 shown in FIG. 3 are subjected to the alignment treatment in an alignment treatment direction AD parallel to the second direction D2. The first alignment film 13 and the second alignment film 24 thereby have a function of aligning the liquid crystal molecules in the initial alignment direction parallel to the alignment treatment direction AD. In other words, in the present embodiment, the direction of extension of the gap areas 50 and the sub-areas 60 conforms to the initial alignment direction of the liquid crystal molecules.

In this configuration, a high-speed response mode in which the response speed is higher than a general FFS mode can be implemented. The response speed mentioned here can be defined as, for example, a speed for urging the light transmittance of the liquid crystal layer LC to transition between predetermined levels by applying a voltage between the first electrode E1 and the second electrode E2.

A principle of the high-speed response mode will be explained with reference to FIG. 5 and FIG. 6.

Figure 5:
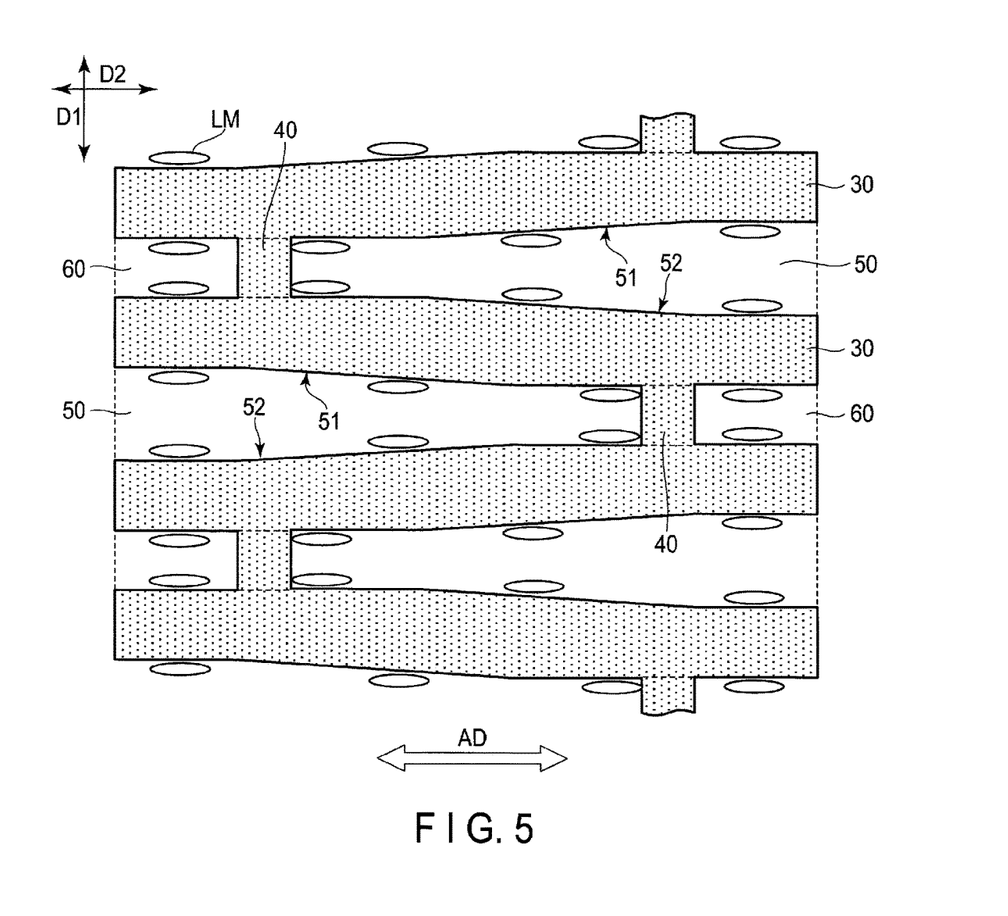
FIG. 5 is an illustration showing an initial alignment state of liquid crystal molecules in the liquid crystal display device.

FIG. 5 is an illustration showing a part of the first electrode E1 (first area A1) and liquid crystal molecules LM included in the liquid crystal layer LC. Each gap area 50 has a first long side 51 and a second long side 52 in the width direction (first direction D1).

The liquid crystal molecules LM are subjected to the initial alignment such that their longitudinal axes conform to the alignment treatment direction AD as shown in FIG. 5, in an OFF state in which no voltage is applied between the first electrode E1 and the second electrode E2.

If a fringing field is formed between two electrodes, in the generally and widely employed FFS mode, all the liquid crystal molecules rotate in the same direction. However, the rotation of the liquid crystal molecules in the liquid crystal mode of the present embodiment is different from the rotation of the liquid crystal molecules in the FFS mode. FIG. 6 is an illustration showing the alignment state of the liquid crystal molecules LM in the ON state. In the present embodiment, the liquid crystal molecules LM have a positive dielectric anisotropy. For this reason, if the voltage is applied between the first electrode E1 and the second electrode E2 in the OFF state shown in FIG. 5, a force to rotate the liquid crystal molecules LM acts such that their longitudinal axes become parallel to the direction of the electric field generated by the voltage application (or their longitudinal axes become orthogonal to the equipotential lines).

Figure 6:
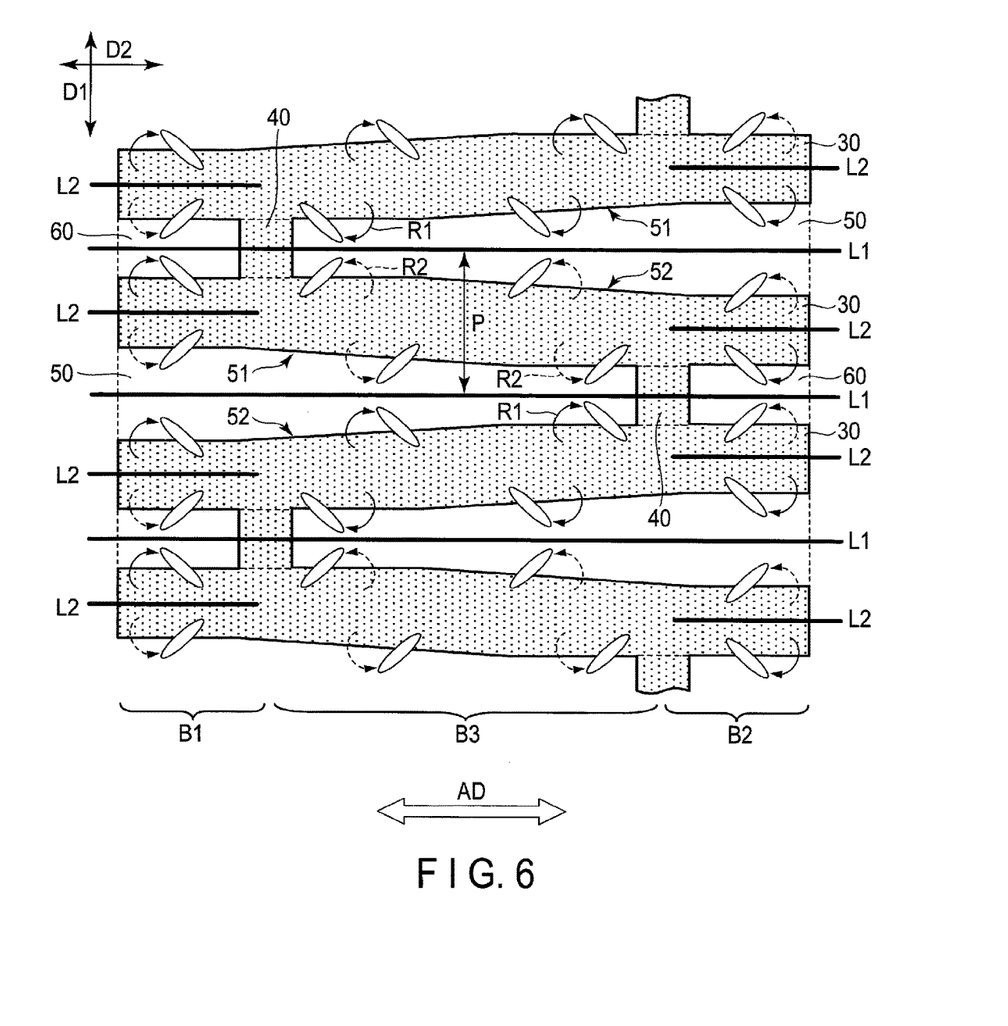
FIG. 6 is an illustration showing an alignment state of liquid crystal molecules on which an electric field acts.

When attention is focused on, for example, the uppermost gap area 50 shown in FIG. 6, the liquid crystal molecules LM rotate in a first rotational direction R1 represented by an arrow of a solid line, in close vicinity to corner portions of the gap area 50 formed at both edges of the long side 51. In addition, the liquid crystal molecules LM rotate in a second rotational direction R2 represented by an arrow of a broken line, in close vicinity to corner portions formed at both edges of the long side 52. The first rotational direction R1 and the second rotational direction R2 are rotational directions opposite to each other.

The corner portions on both edges of each of the long sides 51 and 52 have an alignment control function of controlling the rotational direction of the liquid crystal molecules LM in the vicinity of the long sides 51 and 52 (in other words, a function of stabilizing the alignment). In other words, the liquid crystal molecules LM in the vicinity of the first long side 51 rotate in the first rotational direction R1 in accordance with an influence from the rotation of the liquid crystal molecules LM in close vicinity to the corner portions on both edges of the first long side 51. In addition, the liquid crystal molecules LM in the vicinity of the second long side 52 rotate in the second rotational direction R2 in accordance with an influence from the rotation of the liquid crystal molecules LM in close vicinity to the corner portions on both edges of the second long side 52.

In the gap area 50 adjacent to the uppermost gap area 50 in the figure in the first direction D1, the liquid crystal molecules LM in close vicinity to the first long side 51 rotate regularly in the second rotational direction R2 and the liquid crystal molecules LM in close vicinity to the second long side 52 rotate in the first rotational direction R1. The liquid crystal molecules LM rotate even in close vicinity to the sub-area 60 by the alignment controlling function of the corner portions formed in the surrounding, as illustrated in the figure.

The liquid crystal molecules LM rotating in the rotational directions R1 and R2 are antagonistic, in close vicinity to the center of the gap area 50 and the sub-area 60 in the first direction D1, as represented by a line L1. In addition, the liquid crystal molecules LM rotating in the rotational directions R1 and R2 are also antagonistic, in close vicinity to the center of the gap area 50 and the sub-area 60 adjacent in the first direction D1, as represented by a line L2. For this reason, the liquid crystal molecules LM are maintained in their initial alignment state and hardly rotate in close vicinity to the lines L1 and L2.

Thus, in the high-speed response mode, the rotational directions of the liquid crystal molecules LM in close proximity are aligned along the full length of the first long side 51 and the rotational directions of the liquid crystal molecules LM in the vicinity are aligned along the full length of the second long side 52. Consequently, the response speed in the voltage application can be increased, and alignment stability can be improved while suppressing irregularity of the rotational directions of the liquid crystal molecules LM.

In the high-speed response mode, the response speed becomes higher as the gap between the lines in which the rotational directions of the liquid crystal molecules LM are antagonistic is narrower. In other words, the response speed can be made higher in the areas B1 and B2 in which the line L2 is interposed between the lines L1.

In contrast, in an area B3 between the areas B1 and B2, the response speed becomes lower as compared with the areas B1 and B2 since the line L2 is not interposed. In the area B3, the force to rotate the liquid crystal molecules LM acts strongly since the liquid crystal molecules LM in close vicinity to both sides of the main area 30 rotate in the same rotational direction. The brightness therefore becomes higher in the area B3 than in the areas B1 and B2. In other words, in the present embodiment, the liquid crystal molecules LM in close vicinity to the main area 30 in the area B3 rotate similarly to the rotation of the liquid crystal molecules in the FFS mode.

Thus, the areas B1 and B2 in which the response speed is higher and the area B3 in which the luminance is higher, are formed in the sub-pixel area A in the present embodiment. The response speed and the luminance can be adjusted by adjusting the position of the connection area 40 in the second direction D2, and the liquid crystal display device 1 having a desired performance can be implemented. The response speed in the area B3 can be made higher if the pitch P between the gap areas 50 (i.e., the pitch between the lines L1) is made smaller.

The alignment control function of the corner portions acts sufficiently in close vicinity to the edges of the long sides 51 and 52. The alignment control function of the corner portions may not act and the alignment may become unstable in close vicinity to the centers of the long sides 51 and 52 since the centers are remote from the corner portions. In contrast, the rotational direction of the liquid crystal molecules LM can easily be determined and the alignment can be made stable even in close vicinity to the long sides 51 and 52, by inclining the long sides 51 and 52 to the alignment treatment direction AD.

To incline the first long side 51 sufficiently, both edges of the first long side 51 need to be displaced sufficiently in the first direction D1. The edges of the second long side 52 also need to be displaced similarly. In these cases, however, since the pitch P becomes larger, the response speed in the area B3 becomes slower accordingly. In addition, as the length of the gap area 50 in the second direction D2 is larger, the angle range in which the long sides 51 and 52 can be inclined also becomes narrower.

In the present embodiment, the shape of the gap area 50 is modified for compatibility between stability of the alignment and improvement of the response speed in the area B3. Details of the shape of the first electrode E1 will be explained with reference to the plan view of FIG. 7 while focusing attention on this point.

Figure 7:
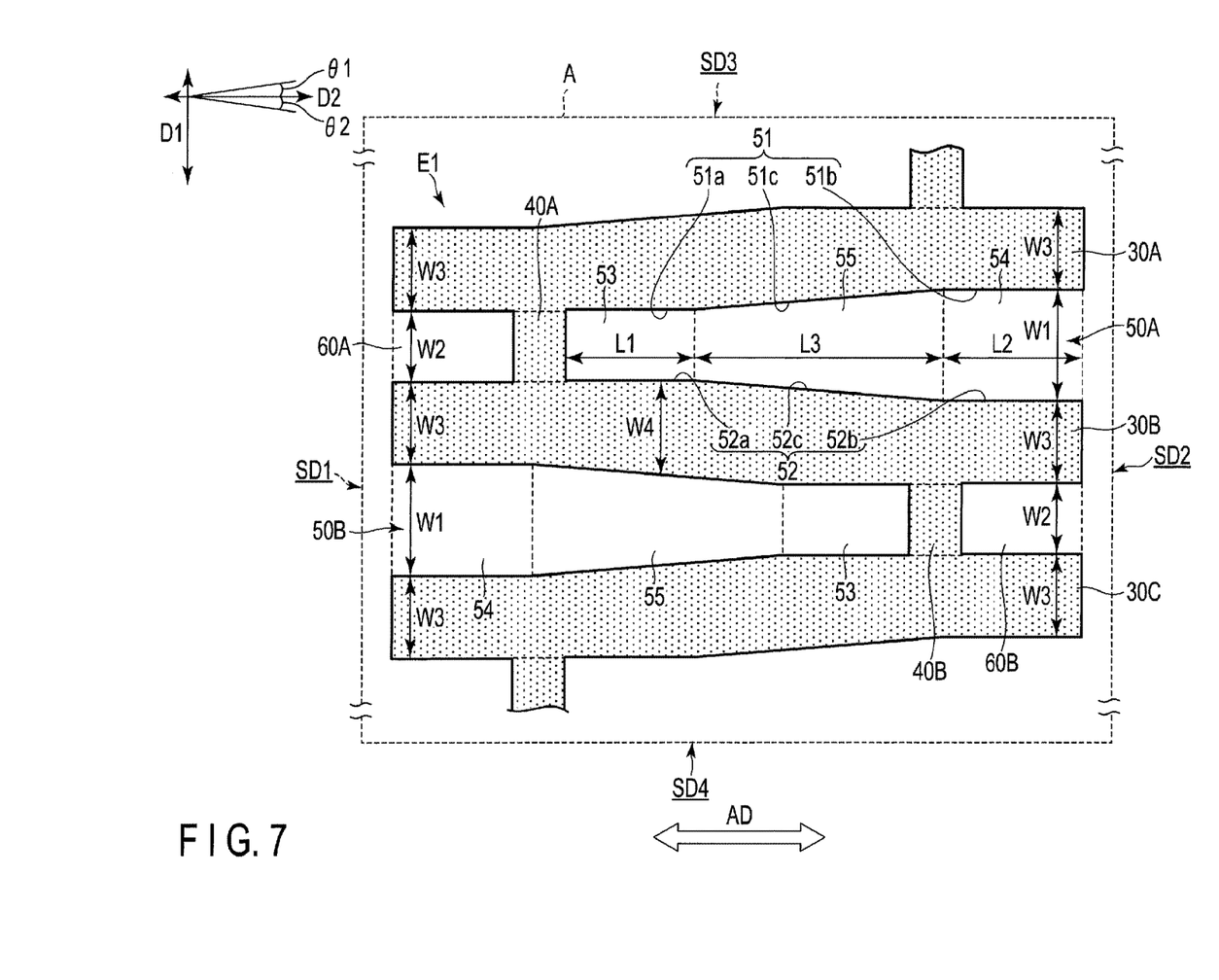
FIG. 7 is a schematic plan view showing a first electrode in the liquid crystal display device.

In FIG. 7, the uppermost main area 30 is called a first main area 30A, the second upper main area 30 is called a second main area 30B, the third upper main area 30 is called a third main area 30C, the connection area 40 which connects the main areas 30A and 30B is called a first connection area 40A, and the connection area 40 which connects the main areas 30B and 30C is called a second connection area 40B. The first connection area 40A is located closely to the first side SD1 and the second connection area 40B is located closely to the second side SD2. Furthermore, the gap area 50 and the sub-area 60 between the main areas 30A and 30B are called a first gap area 50A and a first sub-area 60A, respectively, and the gap area 50 and the sub-area 60 between the main areas 30B and 30C are called a second gap area 50B and a second sub-area 60B, respectively. A force to rotate the liquid crystal molecules LM near the second main area 30B in the same direction acts strongly by disposing the first connection area 40A and the second connection area 40B closely to mutually different sides. The brightness in the vicinity of the center of the second main area 30B therefore can be made higher.

The first gap area 50A includes a first end part 53, a second end part 54 and a central part 55 provided between the end parts 53 and 54. The end parts 53 and 54 and the central part 55 are arranged in the second direction D2. In the first gap area 50A, the first end part 53 is an end part on the first side SD1 and the second end part 54 is an end part on the second side SD2. The first long side 51 of the first gap area 50A includes a first part 51a in the vicinity of the first end part 53, a second part 51b in the vicinity of the second end part 54 and a third part 51c in the vicinity of the central part 55. The second long side 52 of the first gap area 50A includes a first part 52a in the vicinity of the first end part 53, a second part 52b in the vicinity of the second end part 54 and a third part 52c in the vicinity of the central part 55.

In the first gap area 50A, the length of the first end part 53 in the second direction D2 is a first length L1, the length of the second end part 54 in the second direction D2 is a second length L2, and the length of the central part 55 in the second direction D2 is a third length L3.

In the first gap area 50A, the first part 51a and the second part 51b of the first long side 51, and the first part 52a and the second part 52b of the second long side 52 are parallel to the second direction D2. The alignment control function of the corner portions acts sufficiently in close vicinity to the first end part 53 and the second end part 54. Therefore, the alignment in the vicinity of the end parts is stable even if the parts 51a, 51b, 52a and 52b are thus arranged parallel to the second direction D2 (alignment treatment direction AD).

In contrast, the alignment control function may not act sufficiently and the alignment may become unstable in the vicinity to the central part 55. For this reason, in the example shown in FIG. 7, the third part 51c of the first long side 51 is inclined toward the second direction D2 at a first angle θ1 and the third part 52c of the second long side 52 is inclined toward the second direction D2 at a second angle θ2. The first angle θ1 is an acute angle counterclockwise with reference to the second direction D2 and the second angle θ2 is an acute angle clockwise with reference to the second direction D2. For example, each of the angles θ1 and θ2 is greater than or equal to 0.5 degrees and, preferably, greater than or equal to 1.0 degree. The angles θ1 and θ2 are the same as each other in the example shown in FIG. 7 but may be different from each other. In the above-explained shape, the width of the first gap area 50A in the first direction D1 becomes greater in order of the first end part 53, the central part 55 and the second end part 54.

Thus, all the long sides 51 and 52 are not inclined but the vicinity of the central part 55 alone is inclined in the present embodiment. Thus, the range in which the long sides 51 and 52 are inclined is the third length L3 obtained by subtracting the first length L1 and the second length L2 from the full length of the first gap area 50A. The long sides 51 and 52 can be therefore inclined at a great angle in the vicinity to the central part 55 at which the alignment becomes unstable.

If the lengths L1 and L2 are increased, the angles θ1 and θ2 can be made greater but the parts 51a, 51b, 52a and 52b may reach the area in which the alignment is unstable. Therefore, a boundary between the second part 51b and the third part 51c, a boundary between the second part 52b and the third part 52c, and the second connection area 40B may be arranged to be aligned in the first direction D1 as shown in, for example, FIG. 7. In addition, for example, each of the lengths L1 and L2 may be desirably set at 7 μm or less (L1, L2≤7 μm) from the other viewpoint. More desirably, each of the lengths L1 are L2 may be set at 5 μm or less (L1, L2≤5 μm).

The second gap area 50B is shaped to have line symmetry with the first gap area 50A with reference to an axis parallel to the first direction D1. In other words, in the second gap area 50B, the first end part 53 is an end part on the second side SD2 and the second end part 54 is an end part on the first side SD1. In addition, the second main area 30B is shaped to have line symmetry with the first main area 30A with reference to an axis parallel to the first direction D1 or the second direction D2. The third main area 30C has the same shape as the first main area 30A. When the first electrode E1 is entirely seen, the first gap areas 50A and the second gap areas 50B of the above-explained shape are arranged alternately.

When attention is focused on, for example, the first side SD1, a width of the second gap area 50B in the first direction D1 is a first width W1, a width of the first sub-area 60A in the first direction D1 is a second width W2, and a width of each of the main areas 30A, 30B, and 30C in the first direction D1 is a third width W3. In addition, when attention is focused on, for example, the second side SD2, a width of the first gap area 50A in the first direction D1 is a first width W1, a width of the second sub-area 60B in the first direction D1 is a second width W2, and a width of each of the main areas 30A, 30B, and 30C in the first direction D1 is a third width W3.

The first width W1 corresponds to a width of each of the gap areas 50A and 50B in the first direction D1. A width of the first end part 53 of each of the gap areas 50A and 50B in the first direction D1 is the second width W2 similarly to the width of each of the sub-areas 60A and 60B. With the widths W1 to W3, the pitch P can be represented as (W1+W2+2*W3)/2.

The electric field between the first electrode E1 and the second electrode E2 is formed more desirably as each of the gap areas 50A and 50B is larger. Thus, the first width W1 and the second width W2 may be made larger. For example, the total value of the first width W1 and the second width W2 is desirably made larger than the value obtained by making the third width W3 double ((W1+W2)>2*W3).

Boundaries between the central part 55 and the end parts 53 and 54 in the first gap area 50A, and boundaries between the central part 55 and the end parts 53 and 54 in the second gap area 50B are displaced in the second direction. Thus, since both sides of the second main area 30B in the first direction D1 include parts which are not parallel to each other, the width of the second main area 30B in the first direction D1 does not become constant. In the example shown in FIG. 7, a fourth width W4 is larger than a third width W3, in the second main area 30B between a boundary between the second end part 54 and the central part 55 of the first gap area 50A, and a boundary between the second end part 54 and the central part 55 of the second gap area 50B. The relations between the fourth width W4 and the third width W3 of the first main area 30A and the third main area 30C are same as that of the second main area 30B.

According to the present embodiment described above, the liquid crystal display device 1 having preferable display quality can be implemented by providing the areas in which the response speed is high (the areas B1 and B2) and the area in which the luminance is high (the area B3) in the sub-pixel area A. Furthermore, stability of the alignment of the liquid crystal molecules can be increased and the display quality can be further enhanced by improving the shape of the gap area 50 as explained with reference to FIG. 7.

In addition to the above, the above-described preferable advantages and the other various advantages can be obtained from the present embodiment.

(Second Embodiment)

The second embodiment will be described. Attention is mainly focused on differences from the first embodiment and the same constituent elements as those of the first embodiment are not arbitrarily explained.

Figure 8:
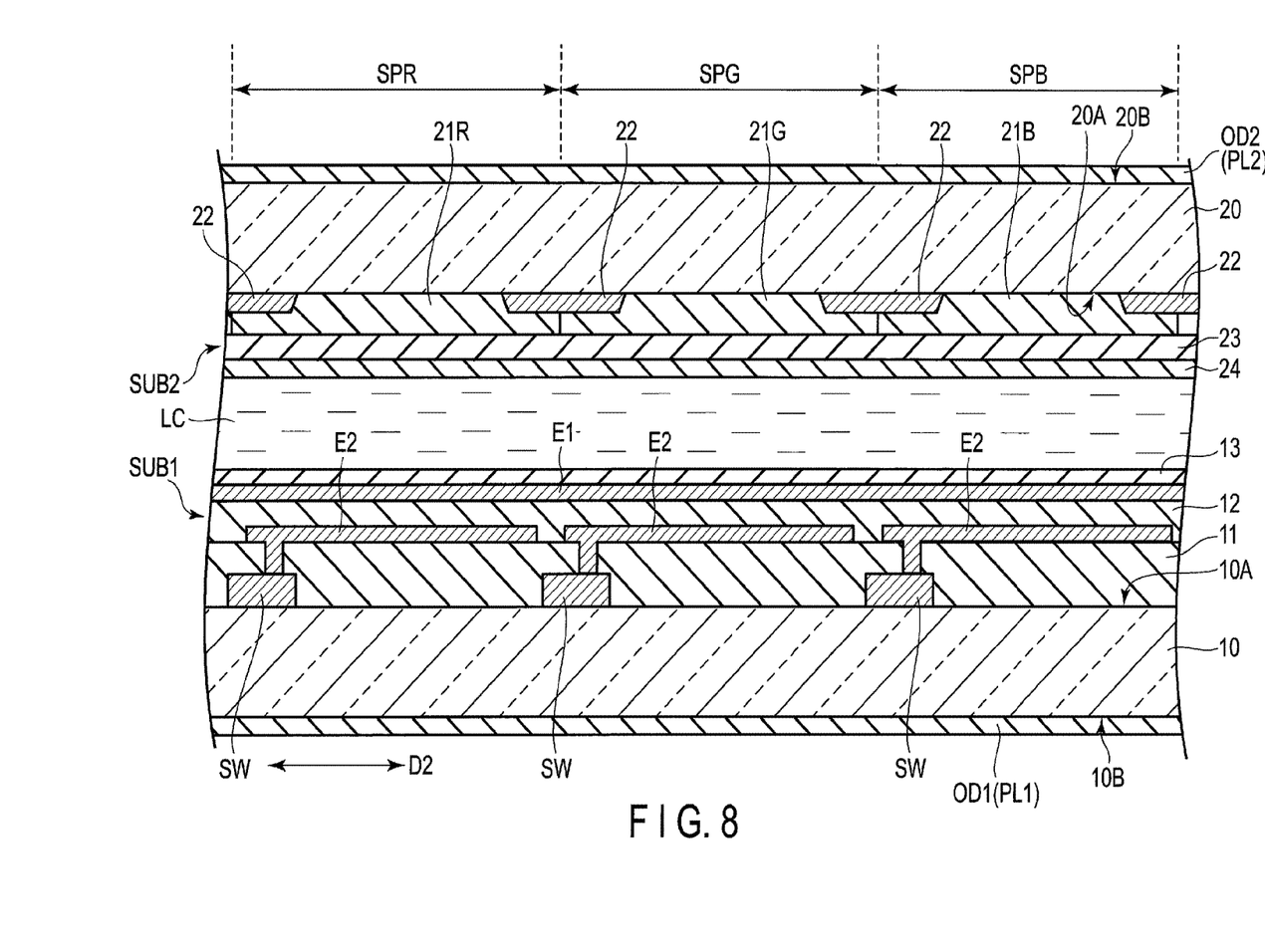
FIG. 8 is a cross-sectional view showing a part of a section of a liquid crystal display device of a second embodiment.

The present embodiment is different from the first embodiment with respect to a feature that a first electrode E1 is a common electrode and a second electrode E2 is a pixel electrode. FIG. 8 is a cross-sectional view showing a part of a section of a liquid crystal display device 1 of the second embodiment. In this figure, a cross-section of sub-pixels SPR, SPG, and SPB in the second direction D2 is illustrated similarly to FIG. 3. Illustration of scanning signal lines G and video signal lines S is omitted and a switching element SW is simplified.

In FIG. 8, the first electrode E1 is provided along the sub-pixels SPR, SPG, and SPB. In contrast, FIG. 8, the second electrodes E2 is provided along the sub-pixels SPR, SPG, and SPB, respectively. The second electrodes E2 are electrically connected with the corresponding switching elements SW.

Figure 9:
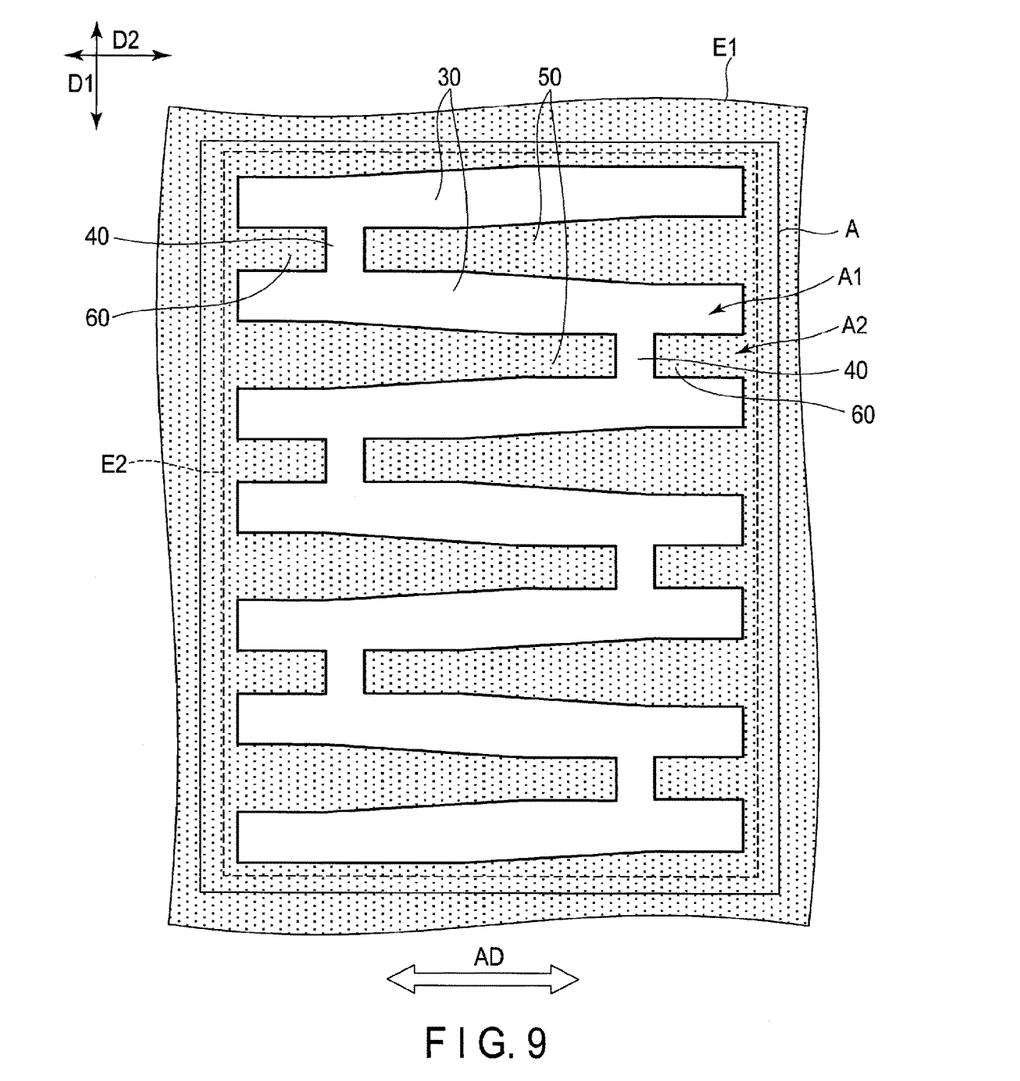
FIG. 9 is a schematic plan view showing a first electrode in the liquid crystal display device.

FIG. 9 is a plan view schematically showing the first electrode E1. An area corresponding to one sub-pixel SP is mainly illustrated in this figure. In the example illustrated, a sub-pixel area A includes a first area A1 and a second area A2, similarly to the sub-pixel area shown in FIG. 4. In addition, the first area A1 includes main areas 30 and connection areas 40, and the second area A2 includes gap areas 50 and sub-areas 60. In the present embodiment, the first electrode E1 is formed in the second area A2 while the first electrode E1 is not formed in the first area A1. In other words, the first area A1 is a slit (opening) including the main areas 30 and the connection areas 40. The second electrode E2 has, for example, an outer shape represented by a broken line frame and is overlaid on the first area A1 in planar view. The shapes of the main areas 30, the connection areas 40, the gap areas 50 and the sub-areas 60 are the same as those in the example shown in FIG. 4.

When an electric field is formed between the first electrode E1 and the second electrode E2, the liquid crystal molecules LM in the vicinity of the gap areas 50 and the sub-areas 60 are rotated similarly to the liquid crystal molecules in the example shown in FIG. 6. In the present embodiment, too, the high-speed response mode can be therefore implemented similarly to the first embodiment.

In the configuration of the present embodiment, too, the alignment of the liquid crystal molecules in close vicinity to the center of the gap areas 50 may become unstable. Therefore, the alignment of the liquid crystal molecules in the vicinity of the center of the gap areas 50 can be made stable by employing the configuration explained with reference to FIG. 7.

In addition, the present embodiment can achieve the same advantages as those obtained by the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the gap area 50 may not include either of the first end part 53 and the second end part 54. In this case, too, the angle of inclination in the vicinity of the center of each of the long sides 51 and 52 can be made greater as compared with a case where the entire body of each of the long sides 51 and 52 of the gap area 50 is inclined. In addition, either of the first long side 51 and the second long side 52 may be inclined toward the alignment treatment direction, at the central part 55 of the gap area 50.

In each of the embodiments, the configuration adoptable in a case where the liquid crystal molecules of the liquid crystal layer LC have positive dielectric anisotropy is explained. However, the liquid crystal layer LC may be formed of liquid crystal molecules having negative dielectric anisotropy. In this case, the alignment treatment direction AD (or the initial alignment direction of the liquid crystal molecules) is set to a direction orthogonal to the direction of extension of the gap area 50.

What is claimed is:

1. A liquid crystal display device comprising a first substrate and a liquid crystal layer including liquid crystal molecules, wherein the first substrate includes video signal lines, a pixel electrode electrically connected to the video signal lines, a common electrode opposed to the pixel electrode and configured to generate an electric field with the pixel electrode to rotate the liquid crystal molecules, and sub-pixel areas including a first area and a second area, the first area is an area where the pixel electrode exists, the second area is an area where the pixel electrode does not exist, the first area includes a first main area and a second main area adjacent to each other, the first main area and the second main area being arranged in a first direction and extending in a second direction intersecting the first direction, the sub-pixel areas each have a first side and a second side in the second direction and have a third side and a fourth side in the first direction, when the electric field is generated, a rotation direction of the liquid crystal molecules is different between near the fourth side of the first main area and near the third side of the second main area, the second area includes a first gap area extending in the second direction, between the first main area and the second main area, the first gap area includes a first end part and a second end part in the second direction, and a central part between the first end part and the second end part, a width of the first gap area in the first direction is greater at the central part than at the first end part, the first gap area includes a long side along the first end part, the central part and the second end part, the long side includes a first part in close vicinity to the first end part, a second part in close vicinity to the second end part, and a third part in close vicinity to the central part, and the first part and the second part are parallel to each other and the third part is inclined toward the first part and the second part.

2. The liquid crystal display device of Claim 1, wherein the width of the first gap area in the first direction is greater at the second end part than at the central part, and the width of the first gap area in the first direction is greater at the central part than at the first end part.

3. The liquid crystal display device of Claim 1, wherein the first substrate includes scanning signal lines intersecting the video signal lines, and the first part and the second part are parallel to the scanning signal lines.

4. The liquid crystal display device of Claim 1, wherein a length of each of the first part and the second part in the second direction is 7 μm or less.

5. The liquid crystal display device of claim 1, wherein the first area further includes a first connection area where the first main area is connected with the second main area.

6. The liquid crystal display device of claim 5, wherein the first area further includes a third main area adjacent to the second main area in the first direction and a second connection area connecting the second main area with the third main area, and
the first connection area is on the first side in the second direction and the second connection area is on the second side in the second direction.

7. The liquid crystal display device of claim 6, wherein the second area further includes a second gap area extending in the second direction between the second main area and the third main area,
a sum of a first width of the first gap area in the first direction and a second width of the second gap area in the first direction is larger than a double of a third width of the second main area in the first direction, on the first side or the second side.

8. The liquid crystal display device of claim 1, wherein the display device further comprises a second substrate opposed to the first substrate,
the first substrate includes a first alignment film,
the second substrate includes a second alignment film,
the liquid crystal layer is sealed between the first alignment film and the second alignment film, and
when the electric field is not generated, the first alignment film and the second alignment film align the liquid crystal molecules in the second direction or a direction orthogonal to the second direction.

9. A liquid crystal display device comprising a first substrate and a liquid crystal layer including liquid crystal molecules, wherein
the first substrate includes video signal lines, a pixel electrode electrically connected to the video signal lines, a common electrode opposed to the pixel electrode and configured to generate an electric field with the pixel electrode to rotate the liquid crystal molecules, and sub-pixel areas including a first area and a second area,
the first area is an area where the common electrode does not exist,
the second area is an area where the common electrode exists,
the first area includes a first main area and a second main area adjacent to each other, the first main area and the second main area being arranged in a first direction and extending in a second direction intersecting the first direction,
the sub-pixel areas each have a first side and a second side in the second direction and have a third side and a fourth side in the first direction,
when the electric field is generated, a rotation direction of the liquid crystal molecules is different between near the fourth side of the first main area and near the third side of the second main area,
the second area includes a first gap area extending in the second direction, between the first main area and the second main area,
the first gap area includes a first end part and a second end part in the second direction, and a central part between the first end part and the second end part,
a width of the first gap area in the first direction is greater at the central part than the first end part,
the first gap area includes a long side along the first end part, the central part and the second end part,
the long side includes a first part in close vicinity to the first end part, a second part in close vicinity to the second end part, and a third part in close vicinity to the central part, and
the first part and the second part are parallel to each other and the third part is inclined toward the first part and the second part.

10. The liquid crystal display device of claim 9, wherein the width of the first gap area in the first direction is greater at the second end part than at the central part, and the width of the first gap area in the first direction is greater at the central part than at the first part.

11. The liquid crystal display device of Claim 9, wherein the first substrate includes scanning signal lines intersecting the video signal lines, and
the first part and the second part are parallel to the scanning signal lines.

12. The liquid crystal display device of Claim 9, wherein a length of each of the first part and the second part in the second direction is 7 μm or less.

13. The liquid crystal display device of claim 9, wherein the first area further includes a first connection area where the first main area is connected with the second main area.

14. The liquid crystal display device of claim 13, wherein the first area further includes a third main area adjacent to the second main area in the first direction and a second connection area connecting the second main area with the third main area, and
the first connection area is on the first side in the second direction and the second connection area is on the second side in the second direction.

15. The liquid crystal display device of claim 14, wherein the second area further includes a second gap area extending in the second direction between the second main area and the third main area,
a sum of a first width of the first gap area in the first direction and a second width of the second gap area in the first direction is larger than a double of a third width of the second main area in the first direction, on the first side or the second side.

16. The liquid crystal display device of claim 9, wherein the first area further includes a third main area adjacent to the second main area in the first direction and a second connection area connecting the second main area with the third main area, and
a boundary between the second part and the third part is opposed to the second connection area in the first direction, in planar view.

17. The liquid crystal display device of claim 9, wherein the display device further comprises a second substrate opposed to the first substrate, the first substrate includes a first alignment film, the second substrate includes a second alignment film, the liquid crystal layer is sealed between the first alignment film and the second alignment film, and when the electric field is not generated, the first alignment film and the second alignment film align the liquid crystal molecules in the second direction or a direction orthogonal to the second direction.

18. A liquid crystal display device comprising a first substrate and a liquid crystal layer including liquid crystal molecules, wherein the first substrate includes video signal lines, a pixel electrode electrically connected to the video signal lines, a common electrode opposed to the pixel electrode and configured to generate an electric field with the pixel electrode to rotate the liquid crystal molecules, and sub-pixel areas including a first area and a second area, the first area is an area where the pixel electrode exists, the second area is an area where the pixel electrode does not exist, the first area includes a first main area and a second main area adjacent to each other, the first main area and the second main area being arranged in a first direction and extending in a second direction intersecting the first direction, the sub-pixel areas each have a first side and a second side in the second direction and have a third side and a fourth side in the first direction, when the electric field is generated, a rotation direction of the liquid crystal molecules is different between near the fourth side of the first main area and near the third side of the second main area, the second area includes a first gap area extending in the second direction, between the first main area and the second main area, the first gap area includes a first end part and a second end part in the second direction, and a central part between the first end part and the second end part, a width of the first gap area in the first direction is greater at the central part than at the first end part, the first area further includes a third main area adjacent to the second main area in the first direction and a second connection area connecting the second main area with the third main area, the first gap area includes a long side on the fourth side along the first end part, the central part and the second end part, the long side includes a first part in close vicinity to the first end part, a second part in close vicinity to the second end part, and a third part in close vicinity to the central part, the first part and the second part are parallel to each other and the third part is inclined toward the first part and the second part, and a boundary between the second part and the third part is opposed to the second connection area in the first direction, in planar view.

19. The liquid crystal display device of claim 18, wherein the width of the first gap area in the first direction is greater at the second end part than at the central part, and the width of the first gap area in the first direction is greater at the central part than at the first end part.

20. The liquid crystal display device of claim 18, wherein the first area further includes a first connection area where the first main area is connected with the second main area.

* * * * *